United States Patent [19]

Misono et al.

[11] Patent Number: 4,478,973

[45] Date of Patent: Oct. 23, 1984

[54] RUBBER COMPOSITION CONTAINING FURNACE CARBON BLACK

[75] Inventors: Shinji Misono; Hiroaki Suzuki, both of Aichi, Japan

[73] Assignee: Tokai Carbon Co., Ltd., Tokyo, Japan

[21] Appl. No.: 575,647

[22] Filed: Jan. 31, 1984

[30] Foreign Application Priority Data

Jan. 31, 1983 [JP] Japan .................................. 58-12888

[51] Int. Cl.$^3$ ................................................ C08K 3/04
[52] U.S. Cl. ..................................... 524/496; 524/526; 524/571; 524/575
[58] Field of Search ................. 524/496, 526, 571, 575

[56] References Cited

U.S. PATENT DOCUMENTS 4,360,074  5/1983  Okado et al. ........................ 524/575
4,383,074  5/1983  Kuan .................................... 524/496
4,398,582  8/1983  Yuto et al. ........................... 524/496

*Primary Examiner*—Herbert J. Lilling
*Attorney, Agent, or Firm*—Armstrong, Nikaido, Marmelstein & Kubovcik

[57] ABSTRACT

A rubber composition is provided which comprises 100 parts by weight of basic rubber and 25 to 250 parts by weight of furnace carbon black having the particle properties defined by an $N_2SA$ higher than 60 m$^2$/g and a DBP higher than 108 ml/100 g and the following selective characteristic values.

True specific gravity $\leq -0.0006 \times N_2SA + 1.8379$

Tinting strength (%) $\geq 0.6979 \times N_2SA - 0.4278 \times DBP + 203.3$

Range of aggregate size distribution ($\Delta Dst$) $\geq 0.6118 \times $ (Dst mode diameter) $+ 30.6$

4 Claims, 1 Drawing Figure

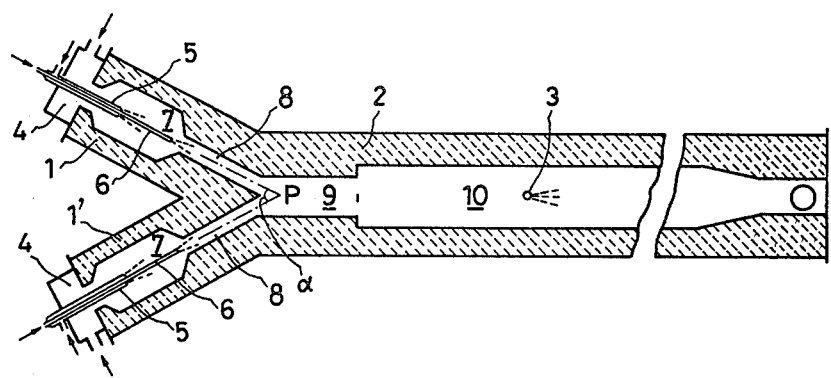

RUBBER COMPOSITION CONTAINING FURNACE CARBON BLACK

BACKGROUND OF THE INVENTION

1. Field of the Invention

The present invention relates to a rubber composition and more particularly to a rubber composition which will find best use in application areas such as the tread of passenger car tires where high abrasion resistance and resilience are required.

2. Description of the Prior Art

Recently, there has arisen a demand for fuel saving of passenger cars through improvement of tires. To meet this demand, researches are being carried out on the rubber material in varied aspects.

The contribution to fuel saving by passenger car tires is realized by reducing the rolling resistance of the tire tread which is encountered during running. It is said that the reduction of rolling resistance is effectively accomplished by imparting to the rubber material the dynamic performance such as high resilience and low heat build-up which reduces the loss of driving energy. It is also said that dynamic properties of rubber can be improved by incorporating rubber with a specific type of carbon black, e.g., so-called soft black of coarse particles or a carbon black having such a broad particle (and aggregate) size distribution that the tinting strength at a given particle size is reduced to a great extent. Such a carbon black, however, tends to be inferior in rubber reinforcement; that is, a rubber composition compounded with it is poor in abrasion resistance which is one of the most important properties required for tire treads.

The present inventors have discovered that these contradictory requirements can be met by a rubber composition compounded with a carbon black having the following properties. The particle diameter is in the range of SAF (super abrasion furnace) and ISAF (intermediate super abrasion furnace). The structure is comparatively low. The true specific gravity is in a specific range ($\leq -0.0006 \times N_2SA + 1.8379$) which is much lower than that of known carbon blacks having the corresponding particle diameter. Owing to this finding, the present inventors were granted Japanese patent No. 1,120,426 (Japanese patent publication No. 34149/1978). This Japanese patent, however, substantially lacks the practical value. According to it, the carbon black which imparts both high abrasion resistance and low heat build-up to the rubber composition is required to have its characteristic values in narrow ranges. That is, the specific surface area measured by the nitrogen adsorption method (hereinafter abbreviated as $N_2SA$) should be 94 to 145 $m^2/g$, and the absorption of dibutyl phthalate (hereinafter abbreviated as DBP) should be 89 to 107 ml/100 g.

SUMMARY OF THE INVENTION

It is an object of this invention to provide a rubber composition having both outstanding abrasion resistance and high resilience which is free of the restriction on $N_2SA$ values and DBP values as set forth in the above-mentioned Japanese patent.

It is another object of this invention to provide a rubber composition to be made into tire treads for fuel saving of passenger cars.

It is further another object of this invention to provide a rubber composition which can be produced with a carbon black having $N_2SA$ values and DBP values in a broad range.

These objects of this invention are achieved by a rubber composition which comprises 100 parts by weight of basic rubber and 25 to 250 parts by weight of furnace carbon black having the particle properties defined by an $N_2SA$ higher than 60 $m^2/g$ and a DBP higher than 108 ml/100 g and the following selective characteristic values.

True specific gravity $\leq -0.0006 \times N_2SA + 1.8379$

Tinting strength (%) $\geq 0.6979 \times N_2SA - 0.4278 \times DBP + 203.3$

Range of aggregate size distribution ($\Delta Dst$) $\geq 0.6118 \times$ (Dst mode diameter) $+ 30.6$

BRIEF DESCRIPTION OF THE DRAWING

The single FIGURE is a longitudinal sectional view of a furnace for producing the furnace carbon black used in this invention.

DESCRIPTION OF THE PREFERRED EMBODIMENTS

The carbon black used in this invention has the particle properties defined by an $N_2SA$ greater than 60 $m^2/g$ and a DBP greater than 108 ml/100 g. The one having an $N_2SA$ lower than 60 $m^2/g$ provides rubber compositions which are high in resilience but poor in abrasion resistance. The one having a DBP lower than 108 ml/100 g is poor in dispersion and processability when compounded into some kinds of highly oil-extended rubber and low-viscosity rubber.

The carbon black having the above-specified particle properties belongs to the classes of HAF (high abrasion furnace) to SAF (super abrasion furnace) in terms of particle diameter, and also belongs to the classes of regular structure to high structure in terms of structure. The carbon black like this effectively imparts high abrasion resistance to rubber compositions; on the other hand, it decreases the resilience of rubber compositions. This contradiction is remedied in this invention by using a carbon black having the following selective characteristic values in addition to the above-mentioned particle properties.

True specific gravity $\leq -0.0006 \times N_2SA + 1.8379$

Tinting strength (%) $\geq 0.6979 \times N_2SA - 0.4278 \times DBP + 203.3$

Range of aggregate size distribution ($\Delta Dst$) $\geq 0.6118 \times$ (Dst mode diameter) $+ 30.6$ The one having a true specific gravity greater than that specified above provides rubber compositions which are poor in both abrasion resistance and resilience. The one having a tinting strength lower than that specified above is poor in reinforcement for abrasion resistance and tensile strength. The one having a range of aggregate size distribution below the above-specified value provides rubber compounds having a very low resilience.

Only those carbon blacks having the above-mentioned properties can impart both high abrasion resistance and resilience to the rubber compositions.

Among the above-mentioned characteristic values, the true specific gravity and the range of aggregate size distribution take part in resilience, the tinting strength contributes to abrasion resistance, and the true specific gravity is concerned in resilience and abrasion resistance.

Carbon blacks usually have a tendency to improve the rubber resilience but decrease in tinting strength as the aggregate size distribution becomes broader. A low tinting strength is disadvantageous to rubber reinforcement.

In spite of the broad aggregate size distribution, the carbon black used in this invention has a high tinting strength. Moreover, as the above-mentioned low true specific gravity indicates, the particles of the carbon black has rough surfaces and are composed of fine crystals. The rough surfaces and fine crystals result from the specific production conditions to keep the carbonization at a low level. These characteristic properties synergistically work to impart high resilience to the rubber composition without sacrificing abrasion resistance.

The carbon black used in this invention should meet all the requirements mentioned above. That is, it should have an $N_2SA$ greater than 60 $m^2/g$ and a DBP greater than 108 ml/100 g, as well as the selective characteristic values.

The carbon black having the above-mentioned characteristic properties is produced by an oil-furnace process using a reactor as shown in the accompanying FIGURE, in which reference numerals 1 and 1' denote a plurality of generators, each being made up of a burner 5, a feedstock oil spray nozzle 6, a combustion chamber 7, and a pyrolysis duct 8. The generators are arranged in such a manner that the pyrolysis ducts converge at point P in the cylindrical tunnel 2. The hydrocarbon feedstock oil is sprayed into the combustion gas of fuel oil so that the oil spray is pyrolyzed. The burned gas streams from the generators enter the tunnel 2 at a high speed and impinge against each other. In operation, adequate adjustments are made for the supply of feedstock oil and other conditions for pyrolysis in the generators and for the position of water spray 3 in the tunnel which determines the residence time for the burned gas to reach the water spray, whereby it is possible to produce the carbon black that has all the characteristic properties specified in this invention.

The rubber composition of this invention is produced by compounding the carbon black into natural rubber or synthetic rubbers such as styrene-butadiene rubber, polybutadiene rubber, isoprene rubber, and butyl rubber in the usual way. The quantity of the carbon black should be 25 to 250 parts by weight, and preferably 40 to 80 parts by weight, based on 100 parts by weight of basic rubber. The rubber composition may be incorporated with the commonly used vulcanizing agent, vulcanization accelerator, accelerator activator, antioxidant, softener, and plasticizer. The resulting composition is mixed, molded, and finally vulcanized.

When the quantity of carbon black compounded is less than 25 parts by weight, the effect on reinforcement of rubber is poor; and when it is in excess of 250 parts by weight, the resulting rubber composition is extremely hard. In each case, the carbon black does not fully exhibit its performance.

The rubber composition of this invention is superior in both abrasion resistance and high resilience to the rubber composition produced according to the aforementioned Japanese patent No. 1,120,425 granted to the present inventors. In addition, it satisfies all the requirements under severe use-conditions such as 300% tensile stress and tensile strength.

According to this invention, the carbon black for the rubber composition does not need to have an extremely limited range of $N_2SA$ and DBP. Thus there is a wide choice in the type of carbon black to be used. This makes the invention of a high practical value.

The rubber composition of this invention is very suitable for making the tire treads for fuel saving of passenger cars.

The characteristic values of the carbon black used in the rubber composition of this invention were measured according to the following methods.

(1) Nitrogen adsorption specific surface are ($N_2SA$)

ASTM D 3037-78 "Standard Methods of Testing Carbon Black-Surface Area by Nitrogen Adsorption" Method B.

The $N_2SA$ of IRB No. 5 measured according to this method was 80.3 $m^2/g$. (IRB stands for Industry Reference Black.)

(2) Dibutyl phthalate absorption (DBP).

JIS K6221 (1975) "Method of Testing Carbon Black for Rubber", Section 6.1.2, Method A (corresponding to ASTM D2414-82)

A prescribed quantity of dry carbon black is placed in the mixing chamber of an adsorptometer. Dibutyl phthalate is added dropwise to the carbon black from a buret with mixing. The buret is closed automatically by the action of a limit switch when the torque of the rotor in the mixing chamber reaches a predetermined value. The absorption is calculated from the following formula.

$$DBP = \frac{V}{W_D} \times 100$$

where
DBP: absorption of dibutyl phthalate (ml/100 g)
V: volume of dibutyl phthalate added (ml)
$W_D$: quantity of dry carbon black (g)

(3) True specific gravity

A carbon black sample is placed in a crucible with a drop lid and devolatized at 650±25° C. for 5 minutes. A proper amount of carbon black is weighed into a pycnometer. After being wetted with a small quantity of benzene, the carbon black is deaerated under a vacuum of 2 to 5 mmHg until bubbling does not occur any longer. The pycnometer is filled with benzene and held in a constant temperature water bath at 25±0.1° C. for 30 minutes. The mass of the pycnometer containing benzene and carbon black is measured.

The true specific gravity of carbon black is calculated from the following formula.

$$\text{True specific gravity} = \frac{(D - A)}{(D - A) - (E - C)} \times d_4^{25}$$

where
A is the mass of the pycnometer,
C is the mass of the pycnometer plus benzene,
D is the mass of the pycnometer plus carbon black sample,
E is the mass of the pycnometer plus carbon black sample plus benzene, and
$d_4^{25}$ is the specific gravity of benzene.

The true specific gravity of IRB No. 5 measured according to this method was 1.7781.

(4) Tinting strength

A dry carbon black sample in an amount of 0.1000 g (±0.0002 g) is mixed with 3.000 g of zinc oxide and 1.50 ml of linseed oil by using a Hoover type muller with 125 rotations (25 rotations in one mixing, repeated 5 times) under a load of 6.8 kg (15 lbs). The resulting paste is applied in a prescribed thickness onto a glass plate using a film applicator (0.002 inch). The reflectance (T) of the carbon black paste applied onto a glass plate is measured with a reflection photometer (Densicron, Welch Scientific Co., A9155, reflector head #3832A) which is so adjusted as to indicate 50% reflectivity for the paste of the standard carbon black sample. The tinting strength of the carbon black sample is calculated from the following formula.

Tinting strength=50/T×(Tinting strength (%) of standard carbon black)

A 100% tinting strength is assumed for the standard carbon black which is "Sterling S", SRF (semireinforcing furnace) having an $N_2SA$ of approximately 23 $m^2/g$ and a DBP of 65 to 70 ml/100 g. For the convenience of comparison, a series of standard carbon blacks are established which vary in tinting strength over a broad range. For example, they are FEF (fast extrusion furnace black), HAF, and ISAF having a tinting strength of 130%, 200% and 230%, respectively. In the following Example, HAF was selected as the standard for Run No. 1 and ISAF was selected for Run Nos. 2 and 3.

The tinting strength of IRB No. 5 measured according to this method was 211%.

(5) Dst mode diameter and range of aggregate size distribution (ΔDst)

A carbon black sample is dried according to JIS K6221 (1975), Section 6.2.1, Method A. The dried carbon black sample is accurately weighed out and dispersed into a 20% aqueous solution of ethanol containing a small quantity of surface active agent (dispersing agent) to prepare a dispersion of carbon black in a concentration of 50 mg/l. Complete dispersion is accomplished ultrasonically.

Then the dispersion is subjected to centrifugal classification by a disk centrifuge (made by Joyes Loebl Co., England) set to 8000 rpm. 10 to 20 ml of spin liquid (2% aqueous solution of glycerin) is added and then 1 ml of buffer (aqueous solution of ethanol) is added. Finally, 0.5 to 1.0 ml of the dispersion of carbon black is added by means of a syringe. Centrifugation is started. Simultaneously, the recorder is also started to draw a distribution curve of aggregates.

The Dst mode diameter is defined as the equivalent Stokes diameter (mμ) at the mode (maximum absorbance) of the distribution curve of aggregates, and the range of aggregate size distribution (ΔDst) is defined as the difference between two equivalent Stokes diameters at two points on the distribution curve of aggregates at which the absorbance is 50% of the maximum absorbance.

In what follows, the invention is described in more detail with reference to examples.

EXAMPLES

Furnace carbon blacks having an $N_2SA$ greater than 60 $m^2/g$ and a DBP greater than 108 ml/100 g were prepared by using an oil furnace, feedstock oil, and fuel oil as mentioned below.

The oil furnace consists of two generators and one tunnel as shown in the accompanying FIGURE of drawings. Each generator has a combustion chamber 7 (400 mm in inside diameter and 800 mm long, including 200 mm of conical section) and a pyrolysis duct 8 (60 mm in inside diameter and 600 mm long). The combustion chamber 7 is provided with a wind box 4 and coaxially arranged burner 5 and feedstock oil injection nozzle 6. The two generators 1 and 1' are so arranged as to converge with an angle (α) of 60°.

The feedstock oil used was an aromatic hydrocarbon oil having:

| | |
|---|---|
| Specific gravity (15/4° C.) | 1.0703 |
| Engler viscosity (40/20° C.) | 2.10 |
| Benzene isolubles | 0.03% |
| Correlation index (BMCI) | 140 |
| Initial boiling point | 130° C. |

The fuel oil used was a hydrocarbon oil having:

| | |
|---|---|
| Specific gravity (15/4° C.) | 0.903 |
| Viscosity (cSt, at 50° C.) | 16.1 |
| Residual carbon content | 5.4% |
| Sulfur content | 1.8% |
| Flash point | 96° C. |

Table 1 shows the operating conditions used in the production of the furnace carbon blacks.

Table 2 shows the characteristic properties of the carbon blacks. It should be noted that the carbon blacks in Run Nos. 1 to 3 meet the requirements of this invention, whereas the carbon black in Run No. 4 (Comparative Example) in which the residence time was extended does not have the true specific gravity as specified.

TABLE 1

| Run No. | 1 | | 2 | | 3 | | 4 | |
|---|---|---|---|---|---|---|---|---|
| Generator No. | 1 | 2 | 1 | 2 | 1 | 2 | 1 | 2 |
| Total air supply (Nm³/hr) | 250 | 250 | 250 | 250 | 200 | 300 | 250 | 250 |
| Air supply for combustion (Nm³/hr) | 4.0 | 4.0 | 4.0 | 4.0 | 3.0 | 5.0 | 4.0 | 4.0 |
| Fuel oil supply (kg/hr) | 15.5 | 15.5 | 15.5 | 15.5 | 12.1 | 18.8 | 15.5 | 15.5 |
| Combustion rate of fuel (%) | 150 | 150 | 150 | 150 | 150 | 150 | 150 | 150 |
| Feedstock oil supply (kg/hr) | 62.1 | 46.3 | 57.0 | 37.0 | 42.2 | 33.5 | 55.3 | 55.3 |
| Residence time in furnace* (msec) | 16.3 | 14.2 | 11.9 | 22.7 | | | | |

*Time required for the burned gas to flow from the forward end of the feedstock oil nozzle to the water quenching point.

TABLE 2

| Run No. | Example | | | Comparative Example | | | | |
|---|---|---|---|---|---|---|---|---|
| | 1 | 2 | 3 | 4 | 5 | 6 | 7 | 8 |
| N$_2$SA (m$^2$/g) | 81 | 92 | 103 | 84 | 74 | 84 | 93 | 102 |
| DBP (ml/100 g) | 137 | 126 | 122 | 130 | 125 | 128 | 121 | 107 |
| True specific gravity | | | | | | | | |
| (measured) | 1.7720 | 1.7541 | 1.7495 | 1.7913 | 1.8020 | 1.7624 | 1.7854 | 1.7698 |
| (calculated)* | 1.7893 | 1.7827 | 1.7731 | 1.7875 | 1.7935 | 1.7875 | 1.7821 | 1.7773 |
| Tinting strength | | | | | | | | |
| (measured, %) | 220 | 220 | 241 | 206 | 202 | 196 | 220 | 230 |
| (calculated)** | 201 | 214 | 223 | 206 | 201 | 207 | 216 | 229 |
| Dst mode diameter (mµ) | 118.6 | 109.8 | 83.3 | 126.3 | 120.2 | 131.5 | 104.5 | 97.4 |
| Dst (measured) | 114.9 | 110.8 | 92.6 | 108.3 | 80.0 | 114.2 | 70.9 | 66.4 |
| (calculated)*** | 103.2 | 97.8 | 81.6 | 107.9 | 104.1 | 111.1 | 100.5 | 90.2 |

*−0.0006 × N$_2$SA + 1.8379
**0.6979 × N$_2$SA − 0.4278 × DBP + 203.3
***0.6118 × (Dst mode diameter) + 30.6

Run Nos. 5 to 8 are in accordance with the conventional production methods. Run No. 8 corresponds to the method disclosed in Japanese patent No. 1,120,426.

The carbon blacks shown in Table 2 were compounded into polybutadiene rubber (BR)/oil-extended styrene-butadiene rubber (SBR) and oil-extended styrene-butadiene (SBR) rubber according to the recipes shown in Table 3. The resulting rubber compositions were vulcanized at 145° C. for 40 minutes (in the case of BR/oil-extended SBR) and 50 minutes (in the case of oil-extended SBR). Table 4 shows the physical properties of the vulcanized rubber compositions.

TABLE 3

Unit: parts by weight

| Components | BR/oil-extended SBR | Oil-extended SBR |
|---|---|---|
| Styrene butadiene rubber (SBR)* | 96.25 | 137.5 |
| Polybutadiene rubber (BR)** | 30 | — |
| Carbon black | 70 | 68.75 |
| Aromatic oil (softener) | 10 | — |
| Stearic acid (dispersing agent and accelerator activator) | 2 | 1.0 |
| Zinc oxide (accelerator activator) | 3 | 3.0 |
| Phenyl-β-naphthylamine (antioxidant) | 0.9 | — |
| Diphenylguanidine (vulcanization accelerator) | 0.5 | — |
| Dibenzothiazyl disulfide (vulcanization accelerator) | 1.2 | — |
| N—oxydiethylene-2-benzothiazolyl-sulphenamide | — | 1.38 |
| Sulfur (vulcanizing agent) | 1.65 | 1.75 |

Note:
*JSR 1712 (made by Japan Synthetic Rubber Co., Ltd.)
**JSR BR01 (made by Japan Synthetic Rubber Co., Ltd.)

TABLE 4

| Run No. | Examples | | | Comparative Examples | | | | |
|---|---|---|---|---|---|---|---|---|
| | 1 | 2 | 3 | 4 | 5 | 6 | 7 | 8 |
| (1) Characteristic properties of rubber compositions based on BR/oil-extended SBR | | | | | | | | |
| Resilience (%) | 43.8 | 41.0 | 48.5 | 41.5 | 43.4 | 41.8 | 38.7 | 37.5 |
| Abrasion resistance | | | | | | | | |
| Lambourn (24% slip) | 105 | 108 | 113 | 99 | 99 | 104 | 108 | 109 |
| Lambourn (60% slip) | 112 | 117 | 123 | 110 | 107 | 110 | 114 | 115 |
| Pico abrasion | 120 | 125 | 132 | 110 | 113 | 116 | 122 | 123 |
| Hardness (JIS, Hs) | 61 | 62 | 63 | 60 | 60 | 62 | 61 | 62 |
| 300% tensile stress (kg/cm$^2$) | 118 | 114 | 118 | 115 | 119 | 120 | 111 | 105 |
| Tensile strength (kg/cm$^2$) | 212 | 219 | 226 | 209 | 202 | 207 | 218 | 220 |
| Elongation (%) | 535 | 545 | 535 | 560 | 510 | 525 | 565 | 545 |
| (2) Characteristic properties of rubber compositions based on oil-extended SBR | | | | | | | | |
| Resilience (%) | 39.2 | 38.0 | 36.0 | 37.6 | 38.5 | 38.0 | 35.7 | 35.1 |
| Abrasion resistance | | | | | | | | |
| Lambourn (24% slip) | 102 | 102 | 104 | 93 | 93 | 99 | 102 | 100 |
| Lambourn (60% slip) | 111 | 113 | 115 | 104 | 103 | 104 | 111 | 108 |
| Pico abrasion | 129 | 139 | 156 | 125 | 120 | 122 | 131 | 136 |
| Hardness (JIS, Hs) | 65 | 66 | 66 | 65 | 64 | 65 | 65 | 65 |
| 300% tensile stress (kg/cm$^2$) | 147 | 144 | 146 | 139 | 145 | 140 | 142 | 136 |
| Tensile strength (kg/cm$^2$) | 238 | 251 | 258 | 238 | 254 | 251 | 259 | 251 |

TABLE 4-continued

| | Examples | | | Comparative Examples | | | | |
|---|---|---|---|---|---|---|---|---|
| Run No. | 1 | 2 | 3 | 4 | 5 | 6 | 7 | 8 |
| Elongation (%) | 485 | 500 | 510 | 510 | 545 | 540 | 530 | 520 |

Note to Table 4:
Methods for abrasion test.
(1) Lambourn abrasion resistance was measured with a Lambourn abrasion tester (of mechanical slip type) under the following conditions.
Test piece: 10 mm thick, 44 mm in outside diameter
Emery wheel: GC type; grain size: 80; hardness: H;
Carborundum added: grain size: 80; adding rate: approximately 9 g/min
Speed of revolution of test piece: 660 rpm
Load on test piece: 4 kg
Relative slipping: 24%, 60%
(2) Pico abrasion resistance was measured according to ASTM D-2228-76 "Standard Test Method for Rubber Property-Abrasion Resistance (Pico Abrader)" under the following conditions.
Load: 44 N
Frequency of rotation: 1 Hz
Speed of revolution: 160 rpm The values of the abrasion tests are expressed in terms of index, with the reference being 100 which is the abrasion of a rubber composition prepared by compounding IRB No. 5 (standard carbon black) into the basic rubber under the same conditions.

Other characteristic properties than above were measured according to JIS K6301 "General Test Methods for Rubbers".

As Table 4 shows, the rubber compositions (Run Nos. 1 to 3) of this invention have high resilience and abrasion resistance and also have a high level of reinforcement, although the carbon black compounded into them has a broad range of $N_2SA$ and DBP (basic particle properties).

In Run Nos. 4 and 6 (Comparative Examples), the carbon blacks used are equivalent to that used in Run No. 1 as long as the particle properties are concerned. However, the former has a true specific gravity and the latter has a tinting strength both of which do not meet the requirements of this invention. Thus the rubber compositions in these runs are poor in abrasion resistance and resilience.

In Run Nos. 5 and 7 (Comparative Examples), the carbon blacks used have a true specific gravity and a range of aggregate size distribution ($\Delta$Dst) which do not meet the requirements of this invention. Thus the rubber composition obtained in Run No. 5 is equal in resilience to that in Run No. 1 and is very poor in abrasion resistance, although the carbon black used has a low $N_2SA$. The rubber composition obtained in Run No. 7 is equal in abrasion resistance to that in Run No. 2 because the carbon black used is equal in $N_2SA$ to that used in Run No. 2; however, it is extremely poor in resilience.

In Run No. 8 (Comparative Example), the basic rubber was compounded with the carbon black having the characteristic properties as specified in Japanese patent No. 1,120,426. This carbon black is equivalent to that used in Run No. 3 in terms of particle diameter, but has a range of aggregate size distribution ($\Delta$Dst) which does not meet the requirement of this invention. Therefore, the rubber composition in Run No. 8 is inferior in both resilience and abrasion resistance to that in Run No. 3.

We claim:

1. A rubber composition which comprises 100 parts by weight of basic rubber and 25 to 250 parts by weight of furnace carbon black having the particle properties defined by an $N_2SA$ higher than 60 $m^2/g$ and a DBP higher than 108 ml/100 g and the following selective characteristic values, True specific gravity $\leq -0.0006 \times N_2SA + 1.8379$
Tinting strength $(\%) \geq 0.6979 \times N_2SA - 0.4278 \times DBP + 203.3$
Range of aggregate size distribution ($\Delta$Dst) $\geq 0.6118 \times$ (Dst mode diameter) $+ 30.6$.

2. A rubber composition as set forth in claim 1, which comprises 100 parts by weight of basic rubber and 40 to 80 parts by weight of furnace carbon black.

3. A rubber composition as set forth in claim 1, wherein the basic rubber is natural rubber, styrenebutadiene rubber, polybutadiene rubber, isoprene rubber, or butyl rubber.

4. A rubber composition as set forth in claim 1, wherein the furnace carbon black is one which is produced by the process characterized by that burned gas streams which are formed by pyrolyzing a feedstock hydrocarbon oil by combustion gas of fuel oil are caused to impinge against each other.

* * * * *